United States Patent [19]

Gallios

[11] Patent Number: 4,509,108
[45] Date of Patent: Apr. 2, 1985

[54] THREE PHASE A.C. TO D.C. VOLTAGE CONVERTER WITH IMPROVED POWER LINE HARMONIC CURRENT REDUCTION

[75] Inventor: George C. Gallios, Setauket, N.Y.

[73] Assignee: Venus Scientific Inc., Farmingdale, N.Y.

[21] Appl. No.: 532,619

[22] Filed: Sep. 15, 1983

[51] Int. Cl.³ .............................................. H02M 1/12
[52] U.S. Cl. ...................................................... 363/45
[58] Field of Search .................. 363/3, 44, 45, 46, 65, 363/67, 69, 70, 125, 126, 128, 129

[56] References Cited

U.S. PATENT DOCUMENTS 4,143,414  3/1979  Brewster et al. ...................... 363/44

FOREIGN PATENT DOCUMENTS 674183   7/1979  U.S.S.R. ............................... 363/129
734862   5/1980  U.S.S.R. ............................... 363/129
741404   6/1980  U.S.S.R. ............................... 363/129
828343   5/1981  U.S.S.R. ............................... 363/129

Primary Examiner—William M. Shoop
Assistant Examiner—Judson H. Jones
Attorney, Agent, or Firm—Ostrolenk, Faber, Gerb & Soffen

[57] ABSTRACT

A three phase a.c. to d.c. voltage converter is disclosed. First, second and third rectifier circuits rectify respective phases of a three phase a.c. source into respective varying d.c. voltages. First, second and third converters connected to the output of the first, second and third rectifier circuits, respectively, each converting the varying d.c. input generated by its associated rectifier circuit into a substantial d.c. voltage. Each of the converters also generate at least one isolated d.c. voltage. At least one of the isolated d.c. voltages is applied to the input of each of the converters to reduce the harmonic currents fed back into the a.c. line.

1 Claim, 5 Drawing Figures

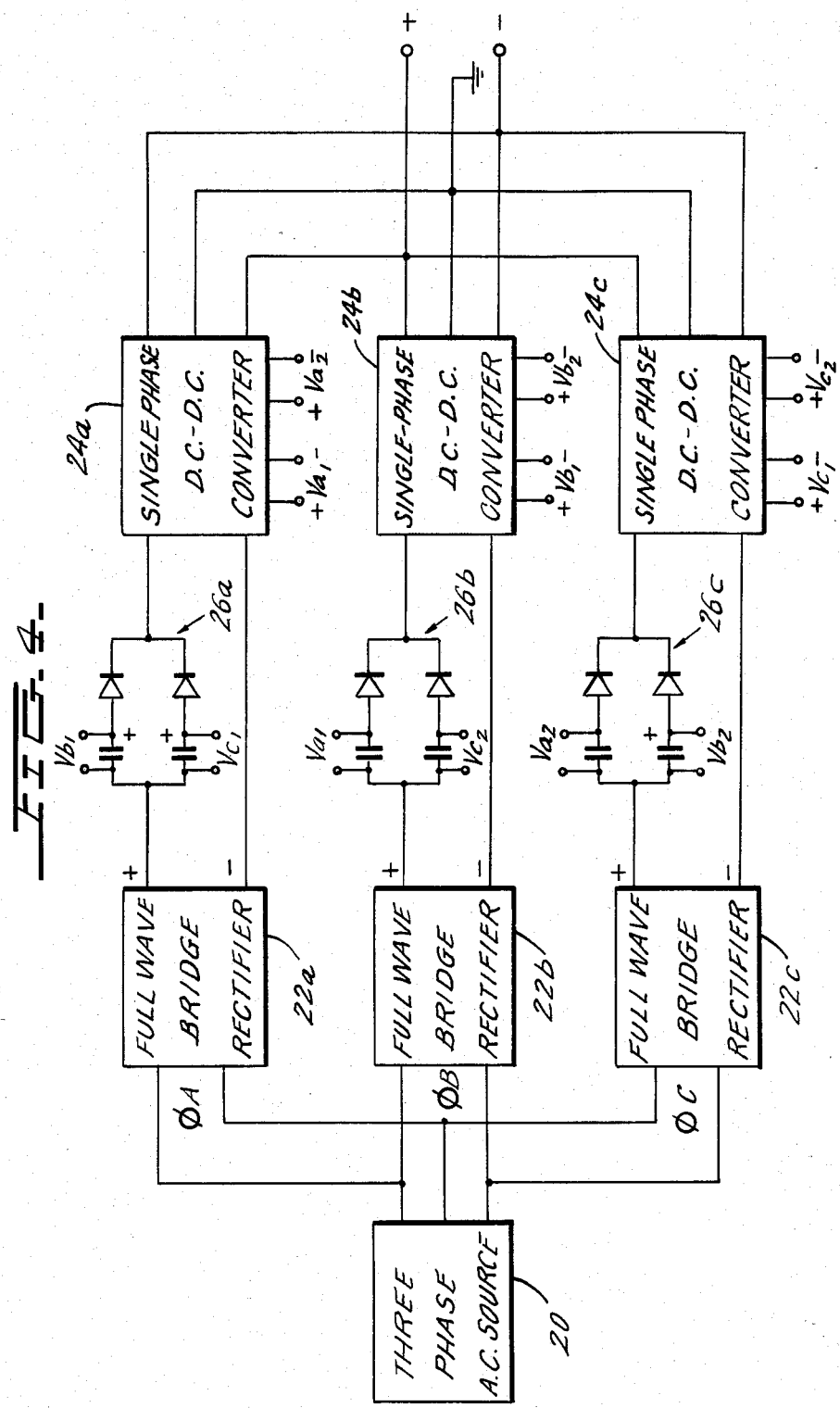

THREE PHASE A.C. TO D.C. VOLTAGE CONVERTER WITH IMPROVED POWER LINE HARMONIC CURRENT REDUCTION

BACKGROUND OF THE INVENTION

The present invention relates to a.c. to d.c. power converters and more particularly to a three phase a.c. to D.C. converter having reduced source line current harmonics.

Three phase input a.c. to d.c. converters are widely used in both connercial and military applications and particularly in high power applications. In a large number of applications, the d.c. output voltage of the converter is self-regulated through the use of phase angle control in the rectification process or the use of d.c. choppers following rectification.

Generally, all forms of a.c. to d.c. converters act as non-linear loads when operating from an a.c. power system. Non-linear loads generate harmonic currents which are fed back to the a.c. power distribution system where they create voltage drops across source impedances and line inductances which, in turn, produce distortions of the voltage waveforms in the distribution or transmission lines of the network. The voltage distortions which result can also produce system shutdown and possible destruction. It is, therefore, desirable to provide converters which are essentially current harmonic free if voltage transients and waveform distortions are to be controlled and eliminated on power distribution networks.

The bridge converter is generally the basic unit of any three phase a.c. to d.c. converter system. However, all basic converter circuits characteristically produce unacceptably large magnitude current harmonics on the three phase a.c. power lines.

In an attempt to overcome this problem, U.S. Pat. No. 4,143,414 to Brewster, the disclosure of which is incorporated herein by reference, suggests the use of separate signal phase a.c. to d.c. converters for each phase of the three phase input source. Each of the single phase a.c. to d.c. converters employs a full wave bridge rectifier feeding a substantially resistive inverter thereby reducing the source harmonics produced by the a.c. to d.c. converter to the extent that the inverter approximates a resistive load. While this circuit represents an improvement over the prior art converters, it is limited by the compliance range, the ratio of maximum input voltage to minimum voltage, of commercially practical converter circuits.

FIG. 1 is a block diagram of the a.c. to d.c. converter of the Brewster patent. As shown therein, the three phases ØA, ØB and ØC of a three phase voltage source 10 are applied to respective full wave bridge rectifiers 12a, 12b and 12c (each rectifier being referred to generally as rectifier 12) whose outputs are coupled to single phase d.c. to d.c. converters 14a, 14b and 14c (each converter being referred to generally as converter 14), respectively. Each converter 14 draws current from its respective bridge rectifier 12 over an input voltage range determined by the construction of the converter 14 and generates an output power which is added to the outputs of the remaining converters 14.

As noted above, the magnitude of the harmonic currents generated by each converter 14 is determined by the ability of the converter to operate in a manner which approximates a resistive load. The converter 14 will operate in a manner which approximates a resistive load as long as the instantaneous input line current (the current from the respective phase of the three phase source) is proportional to the instantaneous input line voltage. To the extent that the converter 14 can approach this ideal current/voltage relationship, the generated harmonics of the fundamental frequency will approach zero amplitude. The ability of the converter 14 to fulfill this relationship is limited by the input voltage range over which the converter can continue to draw a current proportional to the instantaneous input voltage.

FIGS. 2A and 2B illustrate the relationship between the input voltage and input current waveforms wherein the input line current wavefor is proportional to the input voltage waveform over a conduction angle $\theta$. The conduction angle $\theta$ of the converter 14 is a function of both the compliance range of the converter (i.e., the ratio of maximum input voltage to minimum input voltage over which the converter can properly operate) and the magnitude of operating voltages under which the converter normally operates.

The percentage of harmonics generated by the converter decreases as the conductin angle $\theta$ increases up to 180°. This relationship is illustrated graphically in FIG. 3 which illustrates the percentage of fifth harmonic currents which will be generated by the converter as a function of the conduction angle $\theta$. By way of example, if a three percent harmonic distortion is required, the conduction angle will have to be approximately 146°. If a one percent harmonic distortion is required, the conduction angle will have to be approximately 157°. The ability of the converter 14 to achieve such conduction angles is limited by the relatively limited compliance ranges of practical converters and by the magnitude of operating voltages under which many converters, such as military converters, must operate. This can best be understood by way of example.

A typical converter designed for military use will be required to produce full rated power from approximately 200 volts to 320 volts d.c. instantaneous input. If a three percent distortion is required, the conduction angle must be 146° and the converter 16 must draw current during the time period extending between 17° and 163° of each half cycle of the line voltage. Since the line voltage will have a peak value of no less than 200 volts, the converter 14 must begin drawing current at no more than 200 sine 17°=58 volts. This would necessitate the use of a converter which can operate over the range of 58 volts to 320 volts which is almost a 6 to 1 compliance ratio. Such compliance ratios are difficult to achieve thereby limiting the practical ability of the Brewster design to achieve desired distortion levels.

BRIEF DESCRIPTION OF THE PRESENT INVENTION

The primary object of the present invention is to increase the ability of the three phase a.c. to d.c. converter to reduce total harmonic current distortion to even lower levels than is possible following the teachings of the Brewster patent. To this end, the present invention feeds isolated d.c. outputs from each converter into the input of the remaining converters so as to apply a d.c. bias to the input of these converters. As a result, the converters will be able to onduct over conduction angles close to 180°, thereby producing distortion levels of one percent or less.

BRIEF DESCRIPTION OF THE DRAWINGS

For the purpose of illustrating the invention, there is shown in the drawings a form which is presently preferred, it being understood, however, that this invention is not limited to the precise arrangements and instrumentalities shown.

FIG. 4 is a block diagram illustrating the a.c. to d.c. voltage converter of the present invention.

DETAILED DESCRIPTION OF THE INVENTION

Figure 1:
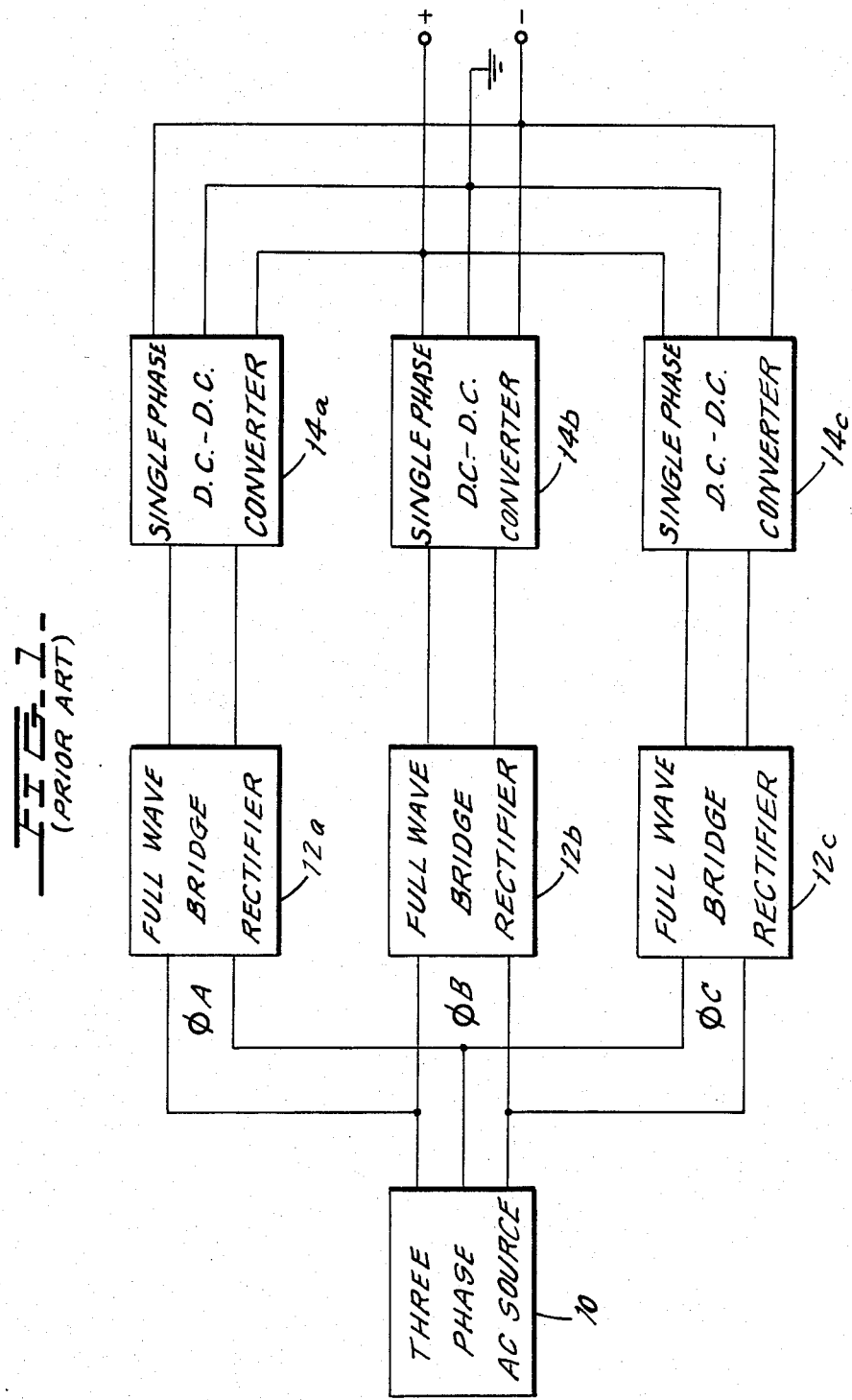
FIG. 1 is a block diagram of an a.c. to d.c. power converter in accordance with the prior art.
Figure 2A:
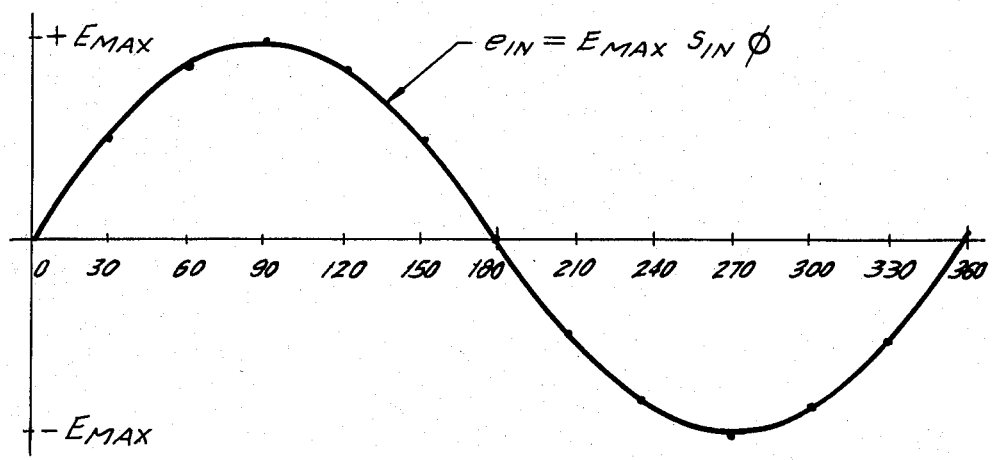
FIGS. 2A and 2B are graphs illustrating waveforms of the input line voltage and input line current of a single phase with a three phase source of FIG. 1.
Figure 2B:
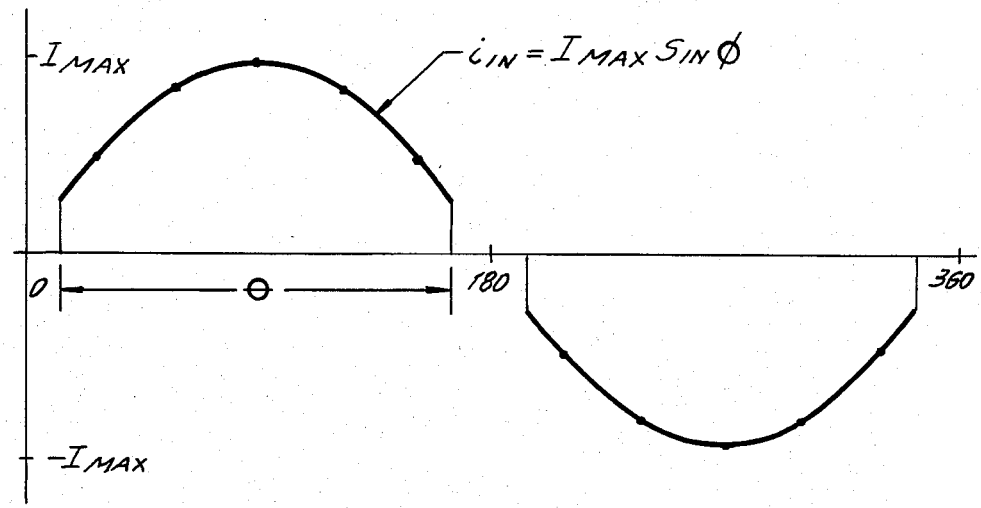
Figure 3:
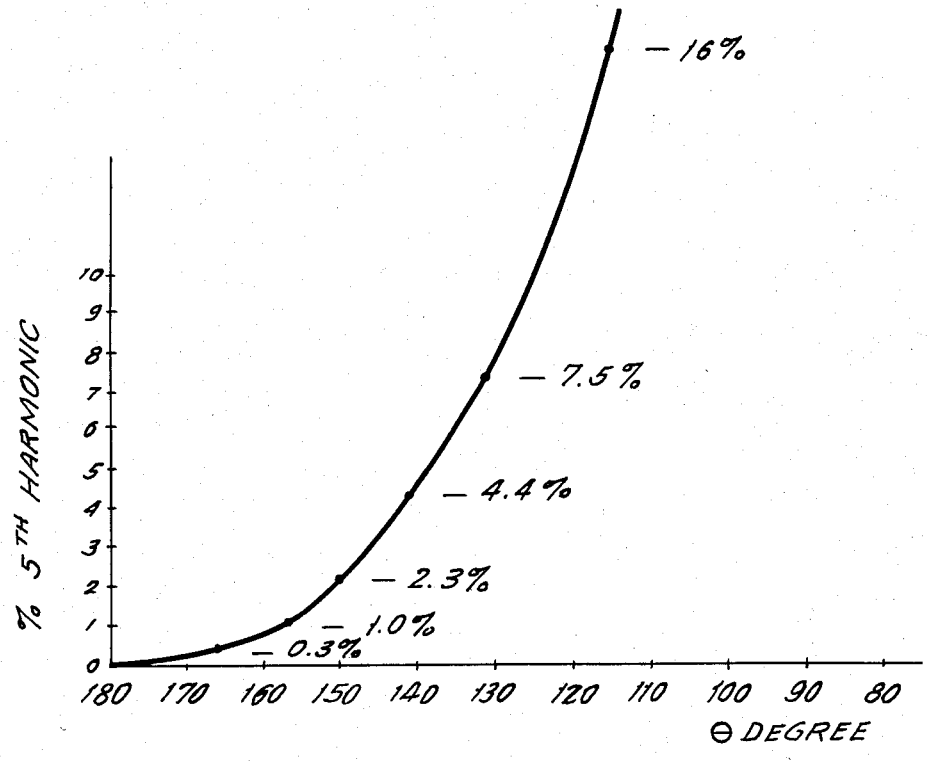
FIG. 3 is a graph illustrating the percent of fifth harmonic generated as a percentage of rated rms input current versus the conduction angle of the converters of FIG. 1.

Referring now to FIG. 4, the a.c. to d.c. voltage converter of the present invention includes three full wave bridge rectifiers 22a, 22b and 22c (each rectifier being referred to generally as rectifier 22) each of which receives a respective phase $\phi A$, $\phi B$ and $\phi C$ of a three phase source 20 and applies its rectified output to a respective single phase d.c. to d.c. converter 24a, 24b and 24c (each converter being referred to generally as converter 24). Each converter 24 converts the varying d.c. voltage appearing at the output of its respective bridge rectifier 22 into a constant d.c. voltage which is added to the d.c. outputs of the remaining converters 24. In order to improve the ability of the circuit to suppress source harmonics, each converter 24 is provided with two additional isolated d.c. outputs Va1 and Va2, Vb1 and Vb2, and Vc1 and Vc2, respectively. These outputs are fed back to the input of the remaining converters 24 so as to apply an additional d.c. bias to the input of each converter. As a result, the converters 24 will have sufficient voltages at their input to permit them to continue to draw current even when their respective a.c. input line voltage falls below the minimum operating voltage of the converter. As a result, the converters will be able to conduct over conduction angles close to 180°, thereby producing distortion levels of one percent or less.

The converters 24 can take any desired construction such as that illustrated in the Brewster patent. It is preferable, however, that the converters 24 have as wide a compliance angle as possible so that the amount of d.c. voltage which must be fed back to the input of the converters to achieve the desired conduction angles can be minimized. To this end, it is preferred that the converter circuit disclosed in copending application Ser. No. 417,465 and assigned to the assignee of the present invention be used. The disclosure of this application is incorporated herein by reference. The converter of the copending application is also particularly useful in connection with the present invention since it has the ability to produce power levels which are particularly advantageous for the present technique. Whatever particular converter is used, additional isolated d.c. output voltages are generated in any known manner by withdrawing appropriate voltages from a secondary winding of the transformer of the converter.

Referring again to FIG. 4, the isolated d.c. voltages generated by each converter 24 are applied as bias to the remaining converters 24 via a respective voltage boost circuit 26a, 26b, 26c. Each voltage boost circuit 26 includes a pair of capacitors and diodes connected in parallel as shown. The upper capacitor of voltage boost circuit 26a will receive the d.c. voltage Vb1 generated by converter 24b while the lower capacitor will receive the d.c. voltage Vc1 generated by converter 24c. The value of these voltages will vary somewhat during the operation of the converters. Since they are connected in parallel through respective diodes, however, they will apply a fairly constant d.c. bias voltage to the converter 24a.

The remaining voltage boost circuits 26b, 26c are identical in construction to 26a and receive the bias voltages shown. As a result, each converter 24 will receive a d.c. bias on its input which effectively increases the input voltage to each converter thereby enabling the converter to conduct for a greater range of input line voltages with the resultant increase in the conduction angle and a consequent reduction in the harmonic current distortion. Particularly, by appropriately selecting the value of the isolated d.c. voltages and the inherent conduction angle of the converter, it is possible to cause the converters to conduct over angles close to 180°, thereby producing distortion levels of one percent or less.

The present invention may be embodied in other specific forms without departing from the spirit or essential attributes thereof and, accordingly, reference should be made to the appended claims, rather than to the foregoing specification as indicating the scope of the invention.

What is claimed is:

1. A three phase a.c. to d.c. voltage converter comprising:

first, second and third rectifier circuits for rectifying respective phases of a three phase a.c. source into respective varying d.c. voltages;

first, second and third converters connected to the output of said first, second and third rectifier circuits, respectively, each of said converters converting the varying d.c. voltage generated by its respective rectifier circuit into a substantially constant d.c. voltage, each of said converters also generating at least one respective isolated d.c. voltage; and means for adding said at least one isolated d.c. voltage of each said converter to a respective one of said varying d.c. voltages such that all of said d.c. voltages are biased by at least one of said isolated d.c. voltages.

* * * * *